US012669520B2

(12) United States Patent
Stella

(10) Patent No.: US 12,669,520 B2
(45) Date of Patent: Jun. 30, 2026

(54) SYSTEM AND METHOD FOR DISPOSING OF A REACTION VESSEL OF A MASS SPECTROMETRY SYSTEM

(71) Applicant: DH Technologies Development Pte. Ltd., Singapore (SG)

(72) Inventor: Aaron Stella, Concord (CA)

(73) Assignee: DH Technologies Development Pte. Ltd., Singapore (SG)

( * ) Notice: Subject to any disclaimer, the term of this patent is extended or adjusted under 35 U.S.C. 154(b) by 595 days.

(21) Appl. No.: 18/016,210

(22) PCT Filed: Jul. 14, 2021

(86) PCT No.: PCT/IB2021/056367
§ 371 (c)(1),
(2) Date: Jan. 13, 2023

(87) PCT Pub. No.: WO2022/013790
PCT Pub. Date: Jan. 20, 2022

(65) Prior Publication Data
US 2023/0333130 A1      Oct. 19, 2023

Related U.S. Application Data

(60) Provisional application No. 63/052,769, filed on Jul. 16, 2020.

(51) Int. Cl.
*G01N 35/00* (2006.01)
*B01L 3/00* (2006.01)
(Continued)

(52) U.S. Cl.
CPC ........ *G01N 35/0099* (2013.01); *B01L 3/5082* (2013.01); *G01N 35/10* (2013.01);
(Continued)

(58) Field of Classification Search
None
See application file for complete search history.

(56) References Cited

U.S. PATENT DOCUMENTS 4,310,488 A * 1/1982 Rahm ....................... B01L 9/06
422/549
4,861,553 A * 8/1989 Mawhirt .............. G01N 35/021
422/65
(Continued)

FOREIGN PATENT DOCUMENTS

CN      103364577 A      10/2013
EP      1361440 A1      11/2003
(Continued)

OTHER PUBLICATIONS

International Search Report and Written Opinion, PCT/IB2021/056367, Dated Oct. 18, 2021, pp. 16.
(Continued)

*Primary Examiner* — Brian R Gordon
(74) *Attorney, Agent, or Firm* — Potomac Law Group, PLLC; Reza Mollaaghababa; Brian Hairston

(57) ABSTRACT
An analyzer and sample handling system suitable for retrieving and processing a sample housed within a suitably configured reaction vessel, and then discarding the used reaction vessel by vertically or axially pushing downward on the vessel supported in a suitably configured tray with a pressing member that forms part of an autosampler assembly are disclosed herein.

14 Claims, 6 Drawing Sheets

(51) Int. Cl.
  G01N 35/10 (2006.01)
  H01J 49/04 (2006.01)

(52) U.S. Cl.
  CPC ..... H01J 49/0413 (2013.01); B01L 2200/025
  (2013.01); B01L 2200/18 (2013.01); B01L
  2300/0858 (2013.01)

(56) References Cited

U.S. PATENT DOCUMENTS

| | | | | |
|---|---|---|---|---|
| 5,392,914 A * | 2/1995 | Lemieux | ................ | B65D 71/70 |
| | | | | 422/933 |
| 5,475,610 A * | 12/1995 | Atwood | ............. | B01L 3/50851 |
| | | | | 422/943 |
| 5,779,984 A * | 7/1998 | Kelly | ...................... | B01L 9/543 |
| | | | | 211/60.1 |
| 6,286,678 B1 * | 9/2001 | Petrek | .................... | B01L 9/543 |
| | | | | 422/526 |
| 8,460,622 B2 * | 6/2013 | Motadel | ............... | B01L 3/0275 |
| | | | | 422/526 |
| 8,809,069 B2 * | 8/2014 | Brady | .................... | B01L 3/021 |
| | | | | 422/65 |
| 10,730,053 B2 * | 8/2020 | Curry | ..................... | B01L 9/543 |
| 10,758,909 B2 * | 9/2020 | Hedglin | ............... | B01L 3/0275 |
| 11,173,492 B2 * | 11/2021 | Mendez Padilla | ...... | B01L 9/543 |
| 11,372,011 B2 * | 6/2022 | Wilson | ................... | G01N 35/04 |
| 2002/0110902 A1 * | 8/2002 | Prosser | ................. | G01N 35/10 |
| | | | | 435/287.1 |
| 2003/0012699 A1 * | 1/2003 | Moore | .............. | G01N 35/0098 |
| | | | | 422/400 |
| 2003/0129089 A1 * | 7/2003 | Arnold, Jr. | ............ | G01N 35/10 |
| | | | | 422/526 |
| 2007/0175841 A1 * | 8/2007 | Lyon | ........................ | B01L 9/06 |
| | | | | 211/74 |
| 2010/0089938 A1 * | 4/2010 | Motadel | ................. | B01L 9/543 |
| | | | | 221/282 |
| 2010/0206044 A1 * | 8/2010 | Langer | ............... | G01N 35/1097 |
| | | | | 250/288 |
| 2011/0259443 A1 * | 10/2011 | Preschutti | .............. | A01N 25/00 |
| | | | | 137/343 |
| 2011/0306051 A1 * | 12/2011 | Belz | ........................ | A01G 7/00 |
| | | | | 435/6.12 |
| 2015/0276780 A1 * | 10/2015 | Bremer | .............. | G01N 35/1079 |
| | | | | 73/23.41 |
| 2018/0134423 A1 * | 5/2018 | Narvekar | .............. | A61J 1/1412 |
| 2020/0209268 A1 * | 7/2020 | Tajima | ............... | G01N 35/1011 |
| 2020/0355676 A1 * | 11/2020 | Xu | ........................... | B03C 1/01 |
| 2021/0094037 A1 * | 4/2021 | An | ........................... | B01L 9/06 |
| 2021/0242005 A1 * | 8/2021 | Quarles, Jr. | .......... | H01J 49/165 |
| 2023/0020118 A1 * | 1/2023 | Davis | .................. | C12Q 1/6846 |
| 2024/0027347 A1 * | 1/2024 | Wang | ................. | C12N 15/1006 |

FOREIGN PATENT DOCUMENTS

| | | | |
|---|---|---|---|
| JP | S5624554 A | 3/1981 | |
| JP | S57171265 A | 10/1982 | |
| JP | H10239322 A | 9/1998 | |

OTHER PUBLICATIONS

Marshall Darrell D et al, "Beyond the paradigm: Combining mass spectrometry and nuclear magnetic resonance for metabolomics", Progress in Nuclear Magnetic Resonance Spectroscopy, (Jan. 11, 2017), vol. 100, doi: 10.1016/J.PNMRS.2017.01.001, ISSN 0079-6565, pp. 1-16, XP085047508.

* cited by examiner

SYSTEM AND METHOD FOR DISPOSING OF A REACTION VESSEL OF A MASS SPECTROMETRY SYSTEM

RELATED APPLICATION

This application is a 35 U.S.C. 371 national stage filing of International Application No. PCT/IB2021/056367, filed on Jul. 14, 2021, which claims priority to U.S. provisional application No. 63/052,769 filed on Jul. 16, 2020, entitled "System and Method for Disposing of a Reaction Vessel of a Mass Spectrometry System," which is incorporated herein by reference in its entirety.

FIELD

The present teachings are generally directed to a mass spectrometry system, and specifically is directed to a mass spectrometry and sample handling system for preparing a sample to be analyzed and then analyzing the prepared sample.

BACKGROUND

Conventional mass spectrometry and sample handling systems employ a Mass Spectrometer (MS) and associated sample handling hardware and software for preparing the sample to be subsequently analyzed by the mass spectrometer. The mass spectrometer can be used to analyze the sample and determine the elemental composition of the sample by measuring the mass-to-charge ratio of ions or particles in the sample. The results are typically presented as a mass spectrum, which can help determine the elemental or isotopic signature of the sample. Various types of conventional mass spectrometers with high specificity, such as Liquid Chromatography (LC-MS), Gas Chromatography (GC-MS), and Matrix-Assisted Laser Desorption/Ionization/Time-of-flight (MALDI-TOF MS), are increasingly being used in clinical diagnostics and offer many advantages.

A drawback of the current mass spectrometry and sample handling systems is that they require multiple robotic arms to prepare and transport the sample in suitable containers (e.g., reaction vessels) between the various components of the overall system. Moreover, the sample container once used is typically discarded. As such, the process for handling and discarding the sample containers in the conventional systems is cumbersome and expensive and requires multiple steps. More specifically, the process requires the coordination of movement of multiple robotic arms, which in turn requires complex software management tools to control.

SUMMARY

The present teachings are directed to an analyzer and sample handling system suitable for retrieving and processing a sample housed within a reaction vessel, and then discarding the used reaction vessel by vertically or axially pushing downward on the vessel with a pressing member. The analyzer and sample handling system 10 includes a sample handling and preparation station and an analyzer station. The components and units of the analyzer station and the sample handling system can be controlled by the associated controller. The sample handling and preparation station has suitable structure associated therewith for storing the reaction vessel, and also has suitable structure associated therewith for retrieving the reaction vessel. The sample handling and preparation station then proceeds to fill the reaction vessel with a suitable sample to be subsequently analyzed by the analyzer station. The filled reaction vessel is then conveyed or transported to the analyzer station and placed within a selected hole of a sample tray. The reaction vessel has associated therewith one or more outwardly extending surface features, such as a rib. The tray includes a resilient member associated therewith that occludes, restricts or reduces a portion of the hole, thus reducing the overall diameter of the hole. The rib of the reaction vessel rests on or against the resilient member when the reaction vessel is placed within the hole of the tray, thus supporting the vessel within the hole.

The analyzer and sample handling system and specifically the analyzer station can also include an autosampler assembly that includes a pump assembly and optionally an analyzer, such as a mass spectrometer. The autosampler assembly can also include a needle assembly having a needle element and pressing assembly having a pressing member that is disposed about the needle assembly. The needle assembly is deployable between an initial stowed or retracted position and a subsequent deployed position. The sample can be withdrawn from the reaction vessel via operation of the pump assembly. The removed or withdrawn sample can be conveyed to the mass spectrometer. The pressing member can be axially movable so as to contact a top portion of the reaction vessel and then subsequently apply a downward force or pressure so as to push the rib of the reaction vessel past the resilient member. The reaction vessel can thus be disposed of without requiring the use of an additional robotic arm.

According to one aspect, the analyzer and sample handling system of the present teachings can comprise a sample tray including a plurality of holes formed within a main body of the tray, wherein each of the holes has an opening having a first diameter, and a resilient member associated with each of the plurality of holes and having an opening formed therein, wherein the resilient member is positioned so as to extend across at least a portion of the hole, and wherein the opening of the resilient member has a second diameter that is less than the first diameter of the hole of the tray. The system can also include a reaction vessel having a main body forming an internal chamber and having one or more surface features extending outwardly from an outer surface of the main body, wherein the diameter of the surface feature is larger than the second diameter of the resilient member and smaller than the first diameter of the hole of the tray. Further, the system can include a sample handling and preparation station including a transport unit for holding the reaction vessel and for transporting the reaction vessel to the tray, and a dispensing unit for introducing a sample into the chamber of the reaction vessel. Still further, the system includes an analyzer station including an analyzer unit for analyzing the sample in the reaction vessel, wherein the analyzer unit includes an autosampler assembly having a pump assembly for withdrawing a selected amount of the sample from the reaction vessel, an analyzer in communication with the pump assembly for analyzing the withdrawn sample, a needle assembly in communication with the pump assembly having a needle element movable between a first position where the needle is disposed outside of the chamber of the reaction vessel and a second position where the needle element is disposed within the chamber of the reaction vessel, and a pressing assembly having a pressing member disposed about the needle element and being axially movable along an axis of the needle element.

The tray is configured to be disposed beneath the analyzer unit and the reaction vessel is disposed within the hole of the tray by the transport unit such that the surface feature contacts the resilient member and is supported thereby within the hole, and the pressing member is axially movable so as to apply a downward force to the reaction vessel when positioned within the hole of the tray so as to push the surface feature past the resilient member such that the reaction vessel is no longer supported within the hole.

The transport unit can include a robotic arm, the analyzer includes a mass spectrometer, and the resilient member is formed of rubber. Further, the sample tray is formed of plastic. According to another aspect, the surface feature comprises a rib element.

The present teachings are also directed to a method of processing a sample and a reaction vessel in an analyzer and sample handling system. The method includes providing a sample tray including a plurality of holes formed within a main body of the tray, wherein each of the holes has an opening having a first diameter, and a resilient member associated with each of the plurality of holes and having an opening formed therein, wherein the resilient member is positioned so as to extend across at least a portion of the hole, and wherein the opening of the resilient member has a second diameter that is less than the first diameter of the hole of the tray; providing a reaction vessel having a main body forming an internal chamber and having one or more surface features extending outwardly from an outer surface of the main body, wherein the diameter of the surface feature is larger than the second diameter of the resilient member and smaller than the first diameter of the hole of the tray; introducing a sample into the chamber of the reaction vessel; placing the reaction vessel in one of the plurality of holes of the tray, wherein the surface feature contacts the resilient member and is supported thereby within the hole of the tray; withdrawing a selected amount of the sample from the chamber of the reaction vessel via a needle element; analyzing the withdrawn sample; and applying an axial downward force to the reaction vessel by axially moving a pressing member in a downward direction with sufficient force so as to push the surface feature past the resilient member such that the reaction vessel is no longer supported within the hole of the tray.

According to another aspect, the present teachings are directed to an analyzer and sample handling system, comprising a tray including a plurality of holes formed within a main body of the tray, a reaction vessel having a main body forming an internal chamber for holding a sample, a sample handling and preparation station, and an analyzer station. The sample handling and preparation station includes a transport unit for holding the reaction vessel and for transporting the reaction vessel to the tray, and a dispensing unit for introducing a sample into the chamber of the reaction vessel. The analyzer station includes an analyzer unit for analyzing the sample in the reaction vessel, wherein the analyzer unit includes an autosampler assembly having a pump assembly for withdrawing a selected amount of the sample from the reaction vessel, an analyzer in communication with the pump assembly for analyzing the withdrawn sample, a needle assembly in communication with the pump assembly having a needle element movable between a first position where the needle is disposed outside of the chamber of the reaction vessel and a second position where the needle element is disposed within the chamber of the reaction vessel, and a pressing assembly having a pressing member disposed about the needle element and being axially movable along an axis of the needle element.

The tray is configured to be disposed beneath the analyzer unit and the reaction vessel is disposed within the hole of the tray by the transport unit, and the pressing member is axially movable so as to apply a sufficient downward force to the reaction vessel when positioned within the hole of the tray so as to push the reaction vessel such that the reaction vessel is no longer supported within the hole of the tray.

According to still another aspect, each of the holes of the tray has an opening having a first diameter, and wherein the tray further comprises a resilient member associated with each of the plurality of holes and having an opening formed therein, wherein the resilient member is positioned so as to extend across at least a portion of the hole, and wherein the opening of the resilient member has a second diameter that is less than the first diameter of the hole of the tray. The reaction vessel can include one or more surface features extending outwardly from an outer surface of the main body, wherein the diameter of the surface feature is larger than the second diameter of the resilient member and smaller than the first diameter of the hole of the tray, such that the surface feature contacts the resilient member and is supported thereby within the hole.

The pressing member is configured to push the surface feature past the resilient member such that the reaction vessel is no longer supported within the hole of the tray. Also, the transport unit comprises a robotic arm, and the analyzer comprises a mass spectrometer.

The resilient member can be formed of rubber, and the tray can be formed of plastic. Further, the surface feature comprises a rib element.

BRIEF DESCRIPTION OF THE DRAWINGS

These and other features and advantages of the present teachings will be more fully understood by reference to the following detailed description in conjunction with the attached drawings in which like reference numerals refer to like elements throughout the different views. The drawings illustrate principals of the teachings and, although not to scale, show relative dimensions.

DETAILED DESCRIPTION

Figure 1:
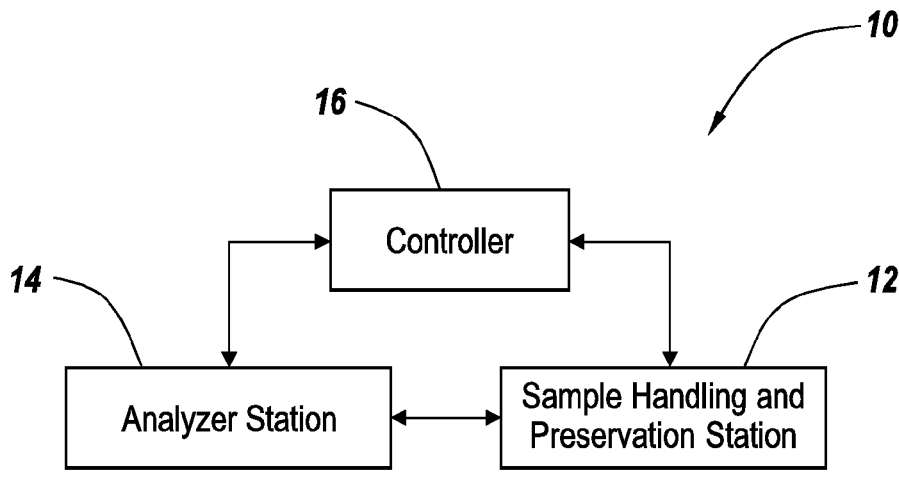
FIG. 1 is a schematic representation of the analyzer and sample handling system according to the teachings of the present teachings.
Figure 2:
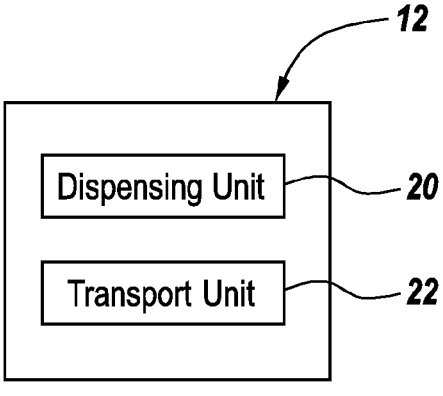
FIG. 2 is a schematic representation of the sample handling and preparation station of the analyzer and sample handling system of FIG. 1.
Figure 3:
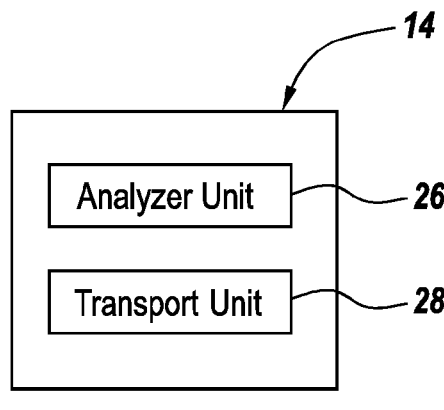
FIG. 3 is a schematic representation of the analyzer station of the analyzer and sample handling system of FIG. 1.
Figure 4:
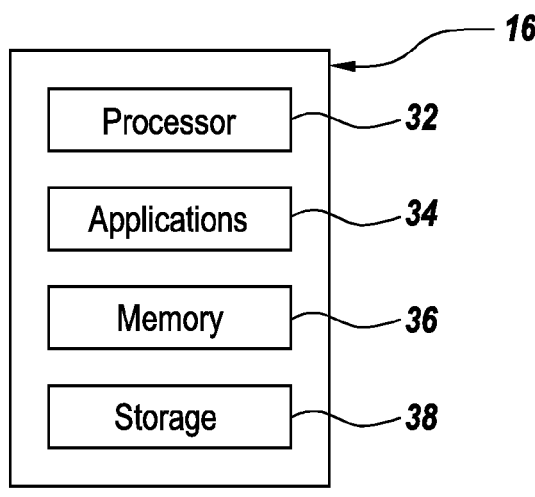
FIG. 4 is a schematic representation of the hardware suitable for implementing the analyzer and sample handling system of the present teachings.

The analyzer and sample handling system 10 of the present teachings is illustrated in FIGS. 1-9. As shown in FIGS. 1-4, the illustrated analyzer and sample handling system 10 includes a sample handling and preparation station or unit 12 that includes a transport unit 22, and an analyzer station or unit 14 that includes an optional transport unit 28. The sample handling and preparation station 12 and the analyzer station 14 can be coupled to and are disposed in communication with a controller 16. The controller 16 is adapted to control one or more functions and operations of the units and components of the sample handling and preparation station 12 and the analyzer station 14. The sample handling and preparation station 12 and the analyzer station 14 can be coupled together according to known techniques and can be arranged in any suitable arrangement. Further, the sample handling and preparation station 12 and the analyzer station 14 can be separate stations or the units associated with each can be integrated into a single housing.

The analyzer and sample handling system 10 of the present teachings is used to detect the presence, absence, or concentration of analytes in a sample 48, including for example biological and chemical samples. Biological samples such as biological fluids may include, but are not limited to, blood, plasma, serum, or other bodily fluids or excretions, such as but not limited to saliva, urine, cerebrospinal fluid, lacrimal fluid, perspiration, gastrointestinal fluid, amniotic fluid, mucosal fluid, pleural fluid, sebaceous oil, exhaled breath, and the like. Chemical samples may include any suitable types of samples that have chemicals associated therewith, including water samples.

The sample handling and preparation station 12 is configured for handling and/or preparing a sample to be analyzed by the analyzer station 14. The sample handling and preparation station 12 can include suitable storage units or reservoirs (not shown) for storing the samples and can include one or more sample containers, such as reaction vessels 40, for storing the sample for subsequent analysis. The sample handling and preparation station 12 can also include structure or components (means), such as a dispensing unit, station or sub-system 20 for dispensing or aliquoting the sample to the reaction vessel. The structure and function of the dispensing unit 20 is well known in the art and forms part of well-known mass spectrometry and sample preparation systems. For example, it is well known that the dispensing unit 20 can include structure for performing the sample preparation and sample introduction functions of the dispensing unit 20, which can be fluidically coupled together. As such, the dispensing unit 20 can also include, if desired, one or more pipetting sub-systems, reagent addition sub-systems, structure and components for holding one or more reagent packs, incubators, wash stations, sample storage units, reaction vessel storage units, and the like. The sample introduction portion of the dispensing unit 20 may include direct flow injection, the use of a trap and elute sub-system (e.g., a pair of pumps and a multi-port switching valve), or the use of an open port sample apparatus such as an open port probe. The details of the dispensing unit 20 are well known and need not be illustrated or described further herein.

The illustrated sample handling and preparation station 14 can also include a transport unit 22 that can include, according to one example, a transport element, such as a robotic arm (not shown), for manipulating the reaction vessel 40. For example, the robotic arm can retrieve a reaction vessel 40 from a storage location (if desired) and hold the reaction vessel when the sample 48 is dispensed or aliquoted therein. The transport arm can then be controlled by the controller 16 to move or transport the reaction vessel 40 to the analyzer station 14.

The analyzer station 14 is illustrated in FIGS. 1, 3 and 8A-8B. The illustrated analyzer station 14 can include an analyzer unit 26 and the optional transport unit 28. The analyzer unit 26 can be configured to analyze the sample 48 and the optional transport unit 28 can include a transport element, such as a robotic arm, for holding, moving and manipulating the reaction vessel 40, if desired.

As used herein, the terms "analyzer unit," "analyzer station," or "analyzers," which may be used interchangeably herein, are intended to include any suitable instrument, instrumentation, assembly or sub-system that is capable of analyzing the sample 48 such as a biological sample. Examples of suitable analyzers include mass spectrometers, immunoanalyzers, hematology analyzers, microbiology analyzers, and/or molecular biology analyzers. In some embodiments, the analyzer unit or station can be an immunoanalyzer suitable for detecting a label (e.g., chemiluminescent, electrochemiluminescent fluorescent, radioactive, isotope, DNA, etc. or label free system). Other types of analyzer units or stations can include hematology analyzers, microbiology analyzers, chemistry analyzers, urine analyzers, biochemical analyzers, and/or a molecular biology analyzers. When analyzing a biological sample, one or more of these types of analyzer units, in any suitable combination, may be used to analyze the biological sample. A hematology analyzer can be used to perform complete blood counts, erythrocyte sedimentation rates (ESRs), and/or coagulation tests. Automated cell counters can sample the blood, and quantify, classify, and describe cell populations using both electrical and optical techniques. The microbiology analyzer can function as a diagnostic tool for determining the identity of a biological organism. In some embodiments, a microbiology analyzer can identify an infecting microorganism. Such analyzers can use biochemicals in a plurality of small sample test microwells in centrifugal rotors that contain different substrates, or in multi-well panels, depending on the type of test being performed. The molecular biology analyzer can be a device which can analyze a biological sample at its molecular level. An example of a molecular biology analyzer may include a nucleic acid analyzer such as a DNA analyzer. The chemistry analyzer can run assays on clinical samples such as blood serum, plasma, urine, and cerebrospinal fluid to detect the presence of analytes relating to disease or drugs. The chemistry analyzer may use photometry. In photometry, a sample is mixed with the appropriate reagent to produce a reaction that results in a color. The concentration of the analyte determines the strength of color produced. The photometer shines light of the appropriate wavelength at the sample and measures the amount of light absorbed, which is directly correlated to the concentration of the analyte in the sample. Another analytical method used in a chemistry analyzer is the use of ion selective electrodes (ISE) to measure ions such as Na+, K+, CI", and Li+. An ISE is a sensor that determines the concentration of ions in a solution by measuring the current flow through an ion selective membrane.

The term "analyte" may include a substance whose presence, absence, or concentration is to be determined according to embodiments of the present teachings. Typical analytes may include, but are not limited to organic molecules, hormones (such as thyroid hormones, estradiol, testosterone, progesterone, estrogen), metabolites (such as glucose or ethanol), proteins, lipids, carbohydrates and sugars, steroids (such as Vitamin D), peptides (such as procalcitonin), nucleic acid segments, biomarkers (pharmaceuticals such as antibiotics, benzodiazepine), drugs (such as immunosuppressant drugs, narcotics, opioids, etc.), molecules with a regulatory effect in enzymatic processes such as promoters, activators, inhibitors, or cofactors, microorganisms (such as viruses (including EBV, HPV, HIV, HCV, HBV, Influenza, Norovirus, Rotavirus, Adenovirus etc.), bacteria (*H. pylori, Streptococcus*, MRSA, *C. diff, Ligionella*, etc.), fungus, parasites (*Plasmodium*, etc.), cells, cell components (such as cell membranes), spores, nucleic acids (such as DNA and RNA), etc.

The analyzer unit 26 can allow for the simultaneous analysis of multiple analytes in the same class or different classes (e.g. simultaneous analysis of metabolites and proteins). In embodiments of the present teachings, the analysis of a particular analyte such as a biomarker may indicate that a particular condition (e.g., disease) is associated with a sample that contains the analyte.

The term "immunoassay" refers to a laboratory method used to determine the amount of an analyte in a sample. It can be based on the interaction of antibodies with antigens, and because of the degree of selectivity for the analyte (either antigen or antibody), an immunoassay can be used to quantitatively determine very low concentrations of analyte in a test sample. An "immunoanalyzer" can include an instrument on which immunoassays have been automated. Various immunoanalyzers are commercially available including the DxI™ system (Beckman Coulter, CA), the AD VIA™ and CENTAUR™ systems (Siemens Healthcare, Germany), the COB AS™ system (Roche Diagnostic, Germany), the ARCHITECT™ system (Abbott, IL), the VITROS™ system (Ortho-clinical Diagnostic, NJ), and the VIDAS™ system (Biomerieux, France).

The term "mass spectrometer" is intended to include an instrument which can measure the masses and relative concentrations of atoms and molecules. One example of a mass spectrometer makes use of the basic magnetic force on a moving charged particle. Basically, the instrument ionizes a sample and then deflects the ions through a magnetic field based on the mass-to-charge ratio of the ion. The mass spectrum can then be used to determine the elemental or isotopic signature of a sample, the masses of particles and of molecules, and to elucidate the chemical structures of molecules, such as peptides and other chemical compounds. Commercially available mass spectrometers can be categorized based on how they sector mass selection, including time-of-flight, quadrupole MS, ion traps (including 3D quadrupole, cylindrical ion traps, linear quadrupole ion traps, orbitraps), Fourier transform ion cyclotron resonance (FTMS), etc. Alternatively, they can be sectored based on ion source (laser desorption, matrix assisted laser desorption, thermal ionization, plasma, spark source, etc.) or detectors (electron multipliers (such as Faraday cups and ion-to-photon detectors), inductive detectors, etc.).

The illustrated controller 16 can be configured to control the components of the sample handling and preparation station 12 and the analyzer station 14 so as to process and analyze one or more samples and provide results regarding the presence, absence, or quantity of a particular analyte in the primary sample. The controller 16 can include any suitable hardware and software for carrying out the operations of the sample handling and preparation station 12 and the analyzer station 14. As shown in a highly simplified form in FIG. 4, the illustrated controller 16 can include a processor 32, suitable application software 34, main memory 36, and storage 38. Without limitation, the techniques described herein can be implemented in digital electronic circuitry or in computer hardware that executes firmware, software, or combinations thereof, for example. The implementation can be as a computer program product (e.g., a computer program tangibly embodied in a machine-readable storage device, for execution by, or to control the operation of, data processing apparatus, such as a programmable processor, a computer, or multiple computers). Generally, the program codes that can be used with the embodiments disclosed herein can be implemented and written in any form of programming language, including compiled or interpreted languages, and can be deployed in any form, including as a stand-alone program or as a component, module, subroutine, or other unit suitable for use in a computing environment. A computer program can be configured to be executed on any suitable electronic device, such as a computer or server, or on multiple electronic devices, which can be located at one site or distributed across multiple sites and interconnected by a communications network, such as the Internet.

Further, the methods and procedures for carrying out the methods disclosed herein can be performed by one or more programmable processors 32 executing a computer program to perform functions of the present teachings by operating on input data and generating output. Further, the methods and procedures disclosed herein can also be performed by, and the apparatus disclosed herein can be implemented as, special purpose logic circuitry, such as an FPGA (field programmable gate array) or an ASIC (application specific integrated circuit). Modules and units disclosed herein can also refer to portions of the computer program and/or the processor/special circuitry that implements that functionality.

Referring again to FIG. 4, the main memory 36 can include a cache unit if desired that is configured to store copies of the data from the most frequently used main storage 36. The processor 32 can be any suitable processor for execution of a computer program. For example, the processor 32 can be a general and/or special purpose microprocessor and/or a processor of a digital computer. The processor can be configured to receive and execute instructions received from the main storage 36. The instructions can include instructions or commands directed to the sample handling and preparation station 12 for retrieving a reaction vessel and then aliquoting a sample therein. The instructions can also include instructions for the transport unit 22 to retrieve and hold the reaction vessel when being filled with the sample, and then transporting the reaction vessel to the analyzer station 14. The controller and the instructions stored executed thereby also control the operation of the components of the analyzer station 14. Further, the processor 32 can comprise a central processing unit (CPU) that includes processing circuitry configured to manipulate instructions received from the main storage 36 and execute various instructions. The CPU can be any suitable processing unit known in the art. For example, the CPU can be a general and/or special purpose microprocessor, such as an application-specific instruction set processor, graphics processing unit, physics processing unit, digital signal processor, image processor, coprocessor, floating-point processor, network processor, and/or any other suitable processor that can be used in a digital computing circuitry. Alternatively or additionally, the processor can comprise at least one of a multi-core processor and a front-end processor.

Generally, the processor 32 can be embodied in any suitable manner. For example, the processor 32 can be embodied as various processing means such as a microprocessor or other processing element, a coprocessor, a controller or various other computing or processing devices including integrated circuits such as, for example, an ASIC (application specific integrated circuit), an FPGA (field programmable gate array), a hardware accelerator, or the like. Additionally or alternatively, the processor 32 can be configured to execute instructions stored in the storage 36 or otherwise accessible to the processor 32. As such, whether configured by hardware or software methods, or by a combination thereof, the processor 32 can represent an entity (e.g., physically embodied in circuitry) capable of performing operations according to embodiments disclosed herein while configured accordingly. Thus, for example, when the processor 32 is embodied as an ASIC, FPGA or the like, the processor 32 can be specifically configured hardware for conducting the operations described herein. Alternatively, as another example, when the processor 32 is embodied as an executor of software instructions, the instructions can specifically configure the processor 32 to perform the operations described herein.

The processor 32 can be configured to receive instructions and data from the main memory 36 (e.g., a read-only memory or a random access memory or both) and execute the instructions. The instructions and other data can be stored in the main memory 36. The processor 32 and the main memory 36 can be included in or supplemented by special purpose logic circuitry. The main memory 36 can be any suitable form of volatile memory, non-volatile memory, semi-volatile memory, or virtual memory included in machine-readable storage devices suitable for embodying data and computer program instructions. For example, the main memory 36 can comprise magnetic disks (e.g., internal or removable disks), magneto-optical disks, one or more of a semiconductor memory device (e.g., EPROM or EEPROM), flash memory, CD-ROM, and/or DVD-ROM disks.

The main memory 36 and the application software 34 can comprise an operating system that is configured to implement various operating system functions. For example, the operating system can be responsible for controlling access to various devices, memory management, and/or implementing various functions of the asset management system disclosed herein. Generally, the operating system can be any suitable system software that can manage computer hardware and software resources and provide common services for computer programs.

The main memory 36 can also hold application software 34. For example, the main memory 36 and application software 34 can include various computer executable instructions, application software, and data structures, such as computer executable instructions and data structures that implement various aspects of the embodiments described herein. For example, the main memory 36 and application software 34 can include computer executable instructions, application software, and data structures, such as computer executable instructions and data structures that implement various aspects of the content characterization systems disclosed herein, such as processing and capture of information. Generally, the functions performed by the content characterization systems disclosed herein can be implemented in digital electronic circuitry or in computer hardware that executes software, firmware, or combinations thereof. The implementation can be as a computer program product (e.g., a computer program tangibly embodied in a non-transitory machine-readable storage device) for execution by or to control the operation of a data processing apparatus (e.g., a computer, a programmable processor, or multiple computers).

The processor 32 can further be coupled to a database or data storage 38. The data storage 38 can be configured to store information and data relating to various functions and operations of the content characterization systems disclosed herein. For example, as detailed above, the data storage 38 can store information including but not limited to captured information, multimedia, processed information, and characterized content.

The processor 32 can further be coupled if desired to a user interface element, such as a display element (not shown). The display can be configured to display information and instructions received from the processor 32. Further, the display can generally be any suitable display available in the art, for example a Liquid Crystal Display (LCD) or a light emitting diode (LED) display. Furthermore, the display can be a smart and/or touch sensitive display that can receive instructions from a user and forwarded the received information to the processor 32.

The controller 16 can further comprise if desired an Input/Output (I/O) interface that is configured to connect the processor 32 to various interfaces via an input/output (I/O) device interface (not shown). The controller 16 can further comprise a communications interface that is responsible for providing the controller 16 with a connection to a communications network. Transmission and reception of data and instructions can occur over the communications network.

Once the transport unit 22 of the sample handling and preparation station 12 moves the reaction vessel 40 to the analyzer station 14, the analyzer station 14 manipulates the reaction vessel and processes the sample by withdrawing at least a selected portion of the sample for subsequent use by the analyzer unit 26. The analyzer unit 26 can process the sample according to known techniques and produce selected data output associated with the analysis of the sample within the reaction vessel. For example, if the analyzer unit 26 is a mass spectrometer, then the unit can then be used to determine the elemental or isotopic signature of a sample, the masses of particles and of molecules, and to elucidate the chemical structures of molecules, such as peptides and other chemical compounds. The analyzer unit 26 can then generate data associated with the analysis of the sample that can be displayed through any suitable associated display device.

Figure 5:
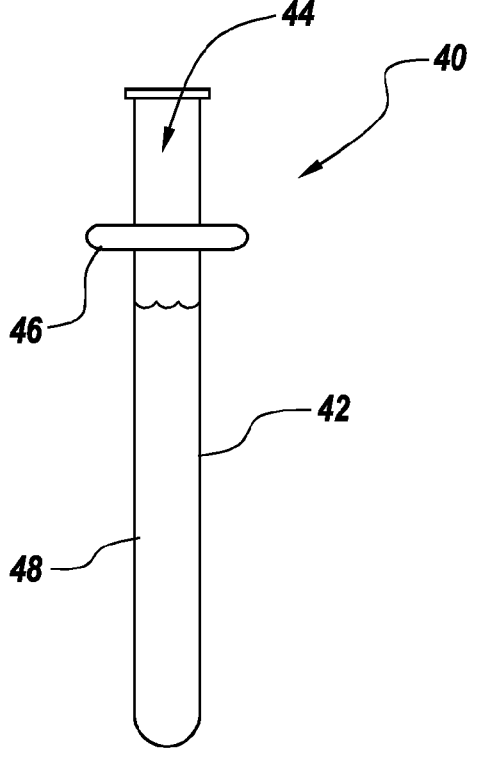
FIG. 5 is a perspective view of a reaction vessel suitable for use with the analyzer and sample handling system of the present teachings.

As shown in FIG. 5, the reaction vessel 40 includes a main body 42 that has a sample chamber 44 formed therein. The chamber 44 is sized and configured to hold the sample 48 in selected amounts that is introduced thereto by the sample handling and preparation station 12. The main body 42 of the reaction vessel also has formed thereon one or more surface features, that extend outwardly from an outer surface of the main body 42 of the reaction vessel. The surface feature can be a continuous surface feature that is disposed about a substantial or complete circumferential portion of the reaction vessel or can comprise a series of discrete surface features that are disposed about the outer surface of the reaction vessel. According to one practice, the surface feature can include a continuous or generally continuous surface feature in the shape of a rib element. Those of ordinary skill in the art will readily recognize that the surface feature can have any selected shape and size, and can be formed along the reaction vessel at any selected location.

Figure 6:
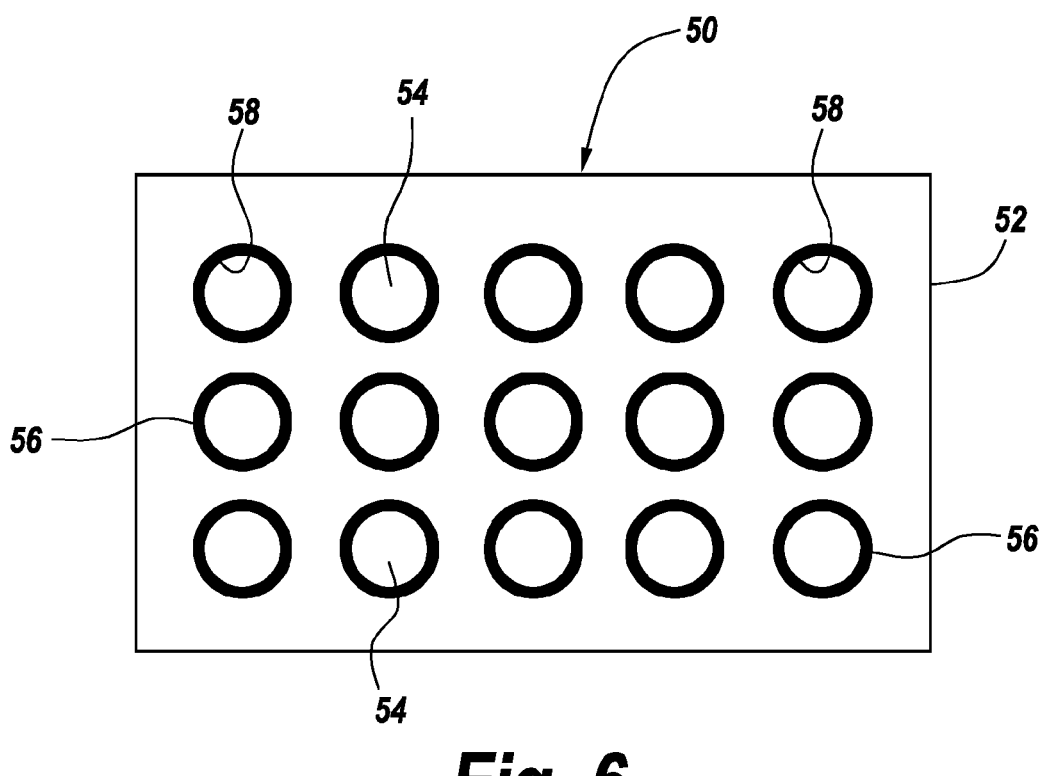
FIG. 6 is a perspective view of a tray suitable for seating the reaction vessel of FIG. 1 according to the teachings of the present teachings.
Figure 7:
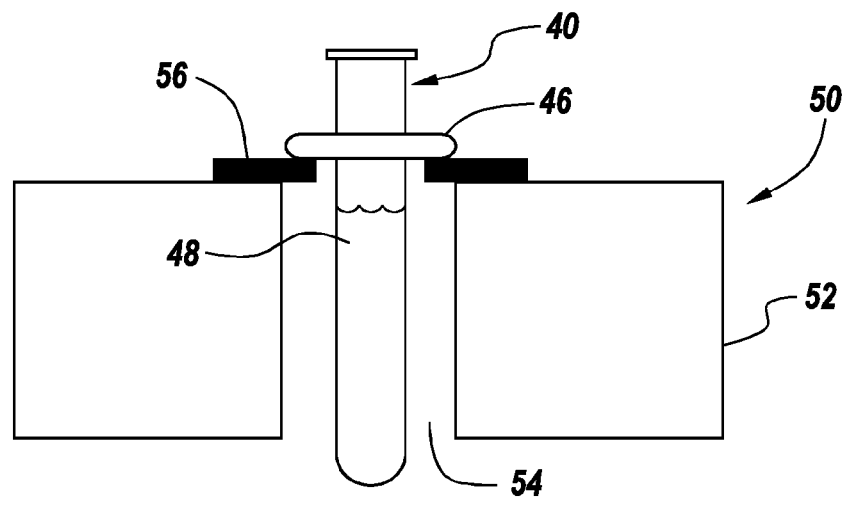
FIG. 7 is a cross-sectional view of the reaction vessel seated within the tray according to the teachings of the present teachings.

FIG. 6 is a schematic view of a removal or sample tray 50 suitable for use with the analyzer station 14 of the present teachings. The illustrated removal tray 50 has a main body 52 that has a series of holes 54 formed therein. The holes 54 have a diameter that are sized and configured to be larger than the diameter of the reaction vessel 40, and specifically larger than the diameter of the reaction vessel and associated surface feature (e.g., rib 46). The holes 54 can also have associated therewith a resilient member 56. The resilient member 56 seats within or protrudes into the hole 54 so as reduce the diameter of the hole 54 to a size that is smaller than the diameter of the reaction vessel and the rib 46. As such, the resilient member 56 supports the reaction vessel when placed within the hole by contacting the rib 46. The mating engagement of the rib 46 and the resilient member 56 is shown in FIG. 7. As shown, the resilient member 56 can have a central opening 58 having a diameter that is less than the diameter of the hole 54. Those of ordinary skill in the art will readily recognize that the tray can have any selected size and configuration and can include any selected number of holes. According to one example, the tray can have fifty holes formed therein. The tray 50 can be formed from any selected material, such as for example plastic. In other embodiments, the tray 50 can be made of any suitable material that offers sufficient rigidity and/or structure, and can include such materials such as metal. As used herein, the term "resilient member" is intended to include any type of member that has a selected degree or amount of flexibility or resilience associated therewith. For example, the resilient member is sufficiently flexible or resilient to allow the reaction vessel to pass through the hole 54 in the tray when a sufficient downward force is applied to the reaction vessel. The resilient member 56 can be formed from any suitable resilient material, such as for example rubber, silicon, sponge rubber or sponge like materials containing either synthetic or natural polymers including polyester, polyurethane or cellulose.

Figure 9:
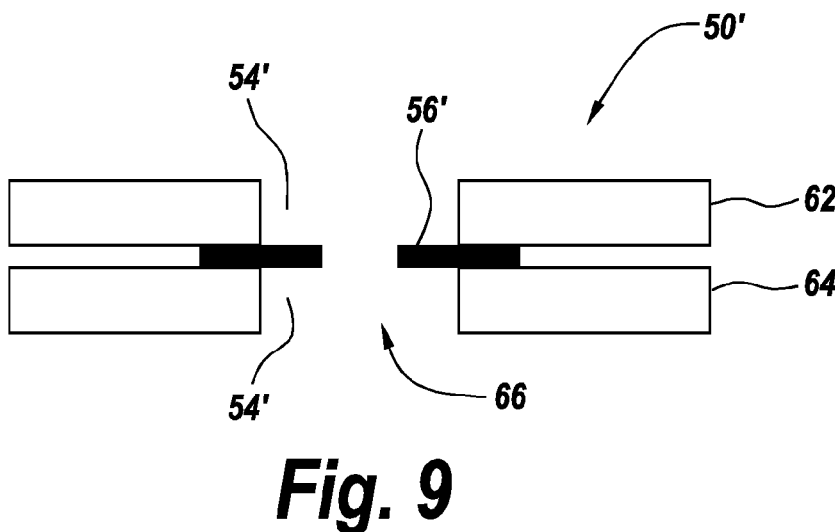
FIG. 9 is a cross-sectional view of a second embodiment of the tray according to the teachings of the present teachings.
Figure 10:
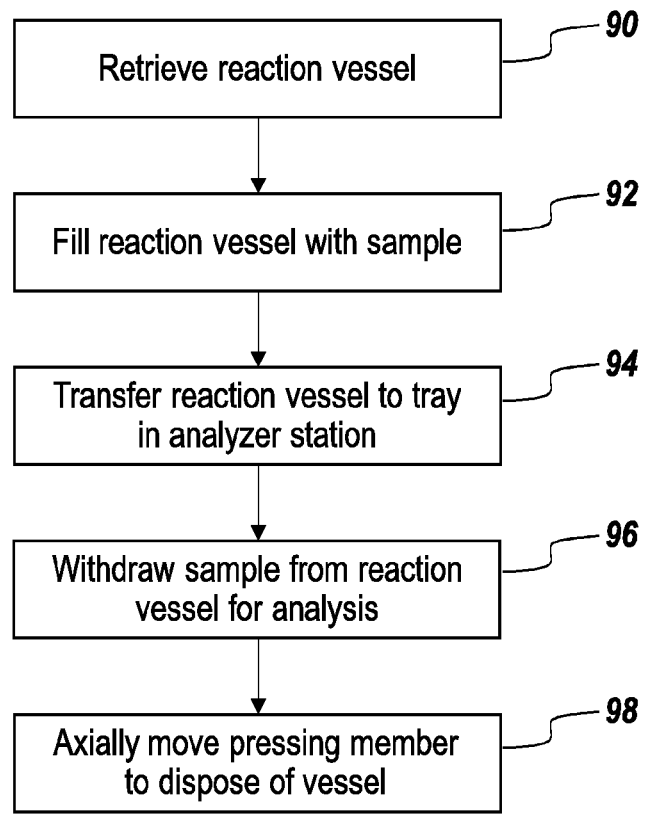
FIG. 10 is a schematic flow chart diagram showing a method for loading the reaction vessel in the tray and then actuating the pressing member to press the reaction vessel through a hole in the tray according to the present teachings.

Another embodiment of the tray is illustrated in FIG. 9. Like reference numerals refer to like parts with a designated prime. The illustrated tray 50' includes a pair of plate elements, namely, a top or first plate 62 and a bottom or second plate 64. The plates 62, 64 each have formed therein a series of holes 54', such that when the plates are stacked together, the holes are aligned or in registration with each other (as shown) to form an overall hole passage 66. The resilient member 56' is disposed between the opposed pair of plates 62, 64 and extends into the hole passage 66. Similar to tray 50, the resilient member 56' serves to reduce the diameter size of the hole 54' and hole passage 66 and allows the rib portion 46 of the reaction vessel 40 to rest or seat thereon and hence serves to hold the vessel within the hole passage 66. Each of the plates, as shown, have opposed top and bottom surfaces. The top and bottom plates 62 and 64 can be coupled or secured together by known techniques, such as by fasteners (not shown).

Figure 8A:
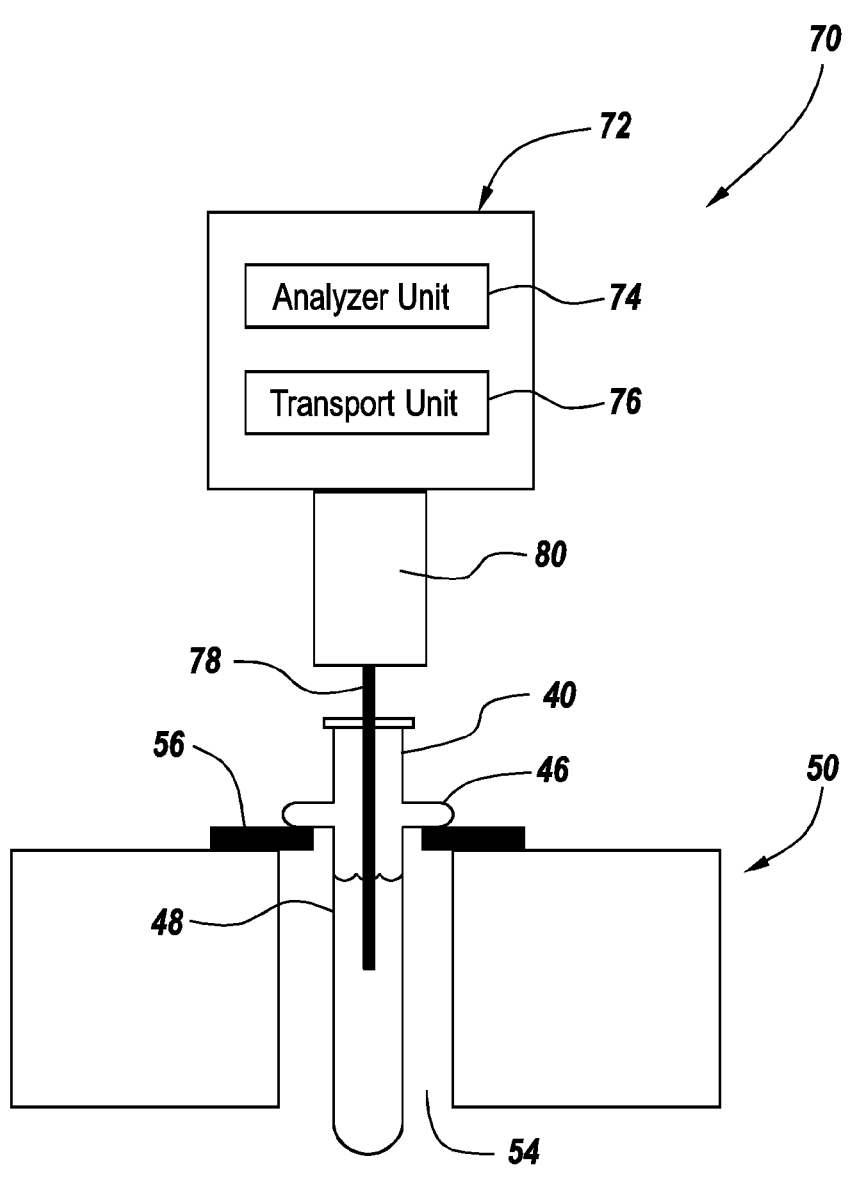
FIG. 8A is a schematic representation of the analyzer station of the analyzer and sample handling system employing an autosampler that includes a pressing member disposed in a first retracted position according to the teachings of the present teachings.
Figure 8B:
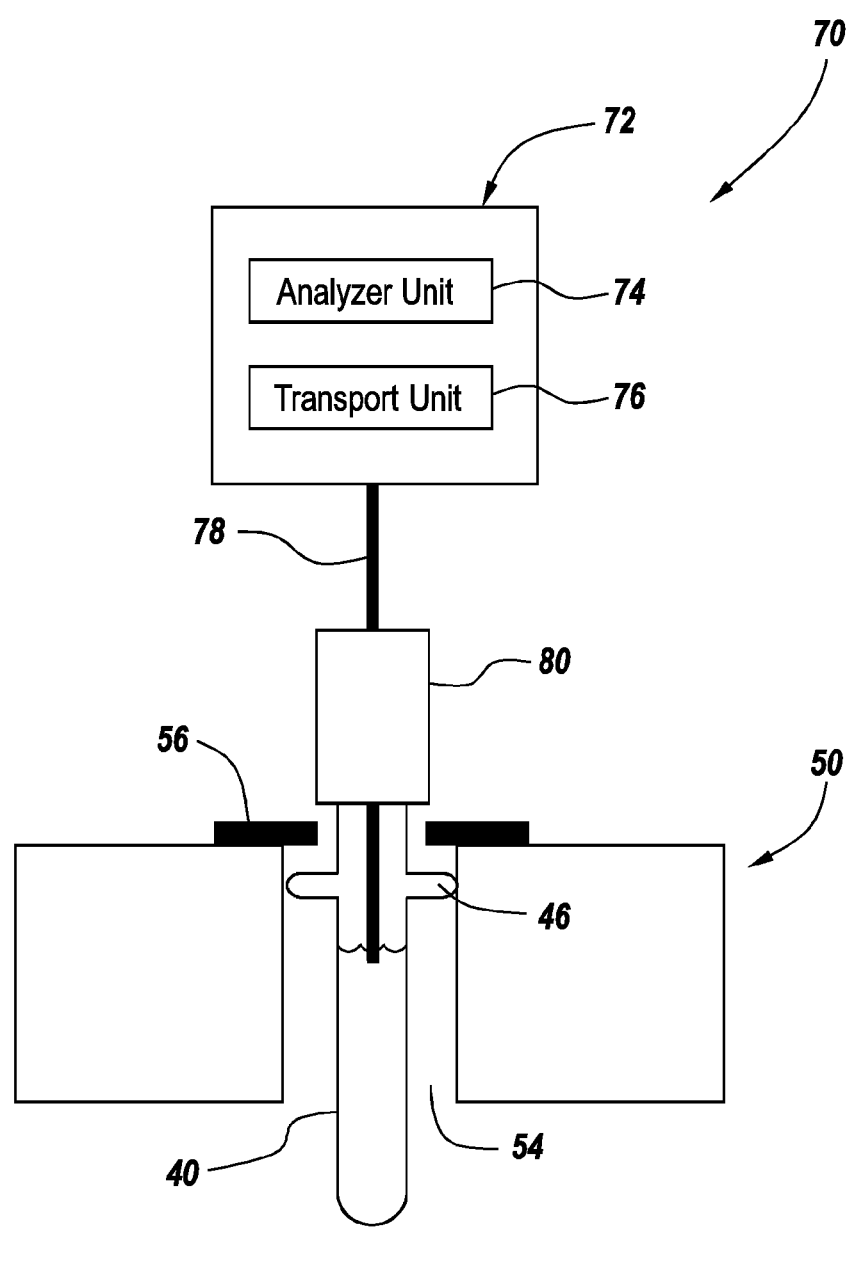
FIG. 8B is a schematic representation of the pressing member of the autosampler disposed in a second deployed position according to the present teachings.

As shown in FIGS. 8A and 8B, the analyzer unit 14 preferably includes an autosampler assembly 70 that can be coupled to or can include an analytical instrument or analyzer for analyzing the contents of the sample. As shown, the illustrated autosampler assembly 70 includes a housing unit 72 that can house an analyzer 74 and a pump assembly 76. The pump assembly can include a pump or other type of structure for creating a negative pressure (e.g., suction) for withdrawing the sample from the reaction vessel 40. The analyzer 74 preferably includes a mass spectrometer. Although depicted as part of the housing 72, the analyzer can also be separately positioned and located. The autosampler assembly 70 also includes a vertically or axially movable needle assembly that includes a needle element 78 and an axially movable piston or pressing assembly that includes a pressing member 80 that is disposed about the needle assembly 78. The needle assembly and the associated needle element 78 are fluidly coupled to the pump assembly 76. Further, the pressing member 80 can surround the needle element 78 and hence has a central aperture or opening that allows the needle element to move axially therein. The movable pressing member 80 can include any suitable structure and have any selected configuration and is capable of moving vertically or axially upward and downward about the needle element 78. The pressing member 80 is further adapted to interface with the reaction vessel 40 so as to be able to move or push the reaction vessel in a vertically or axially downward direction through the hole 54 in the tray 50, 50'.

The tray 50, 50' can be disposed or positioned within the analyzer station 14. The reaction vessel 40 can be filled with the sample 48 in the sample handling and preparation station 12 and then the reaction vessel 40 can be placed in a selected hole 54 of the tray 50,50' via the transport unit 22. The reaction vessel 40 to be sampled can be positioned below or beneath the needle assembly 78. According to one practice, the tray can be horizontally movable by suitable platen structure (not shown) so as to be disposed beneath the needle assembly 78 of the autosampler assembly 70. Alternatively, the tray can be stationary and the needle assembly 78 can be horizontally movable so as to be aligned or disposed above a selected reaction vessel 40 that is to be sampled.

As shown in FIG. 8A, the needle assembly and hence the needle element 78 can be disposed in a first stowed position, where the needle assembly 78 is not disposed in but rather is disposed above the reaction vessel 40 (not shown), and a deployed position where the needle assembly 78 is disposed within the reaction vessel (as shown). The needle element 78 can include a needle element that is disposed within the sample 48 that resides within the reaction vessel 40. When the needle element 78 is deployed as such, the pressing member 80 can be disposed in a first position that is above the reaction vessel or can be placed in intimate facing contact therewith. The pump assembly 76 can then be employed to extract via suction a selected amount of the sample 48 from the reaction vessel 40. The sample that is extracted from the reaction vessel can then be conveyed through known means to the analyzer 74, which can include the mass spectrometer. The mass spectrometer analyzes the sample and generates output data associated with the analysis, as is known in the art. When the autosampler assembly 70 has completed the extraction of the sample 48 from the reaction vessel, the analyzer and sample handling system 10 discards the reaction vessel. According to the present teachings, and as shown in FIG. 8B, the controller 16 instructs the autosampler assembly 70 and specifically the pressing member 80 to move axially or vertically downward into a deployed position, thus pressing against a top portion of the reaction vessel 40. The pressing assembly 80 presses against the top portion of the reaction vessel 40 with sufficient force to force the ribs 46 of the vessel through or past the resilient member 56. When the ribs are free and clear of the resilient member, the reaction vessel 40 falls through the hole 54 since the diameter of the reaction vessel is smaller or less than the diameter of the hole. The reaction vessel can fall into a waste disposal component (not shown) that is placed beneath the tray. The pressing member 80 can be any selected portion or component of the autosampler assembly 70 that is configured or modified to be capable of moving axially a sufficient axial distance so as to press the against the reaction vessel 40 and push or drive the vessel through the tray 50. Examples of components of the pressing assembly suitable for driving or pressing against the reaction vessel include pistons and the like. In other embodiments, a physical robotic arm can be employed to do the driving or pressing/pushing. In a preferred embodiment, an autosampler arm that is already present for the purpose of delivering and/or withdrawing liquid from the reaction vessel can be utilized to push or apply a force to the reaction vessel since this simplifies the overall construction and usage. In such embodiments, the autosampler device is operable to move in the x, y, and z direction and can therefore be utilized for multiple purposes. The force applied in order to push the reaction vessel can be just enough to overcome the force that is keeping the reaction vessel upright in the tray. Further, the pressing assembly can include any selected hydraulic or pneumatic subsystem capable of axially moving the pressing member 80.

In operation, the analyzer and sample handling system 10 of the present teachings retrieves and processes a sample and then discards the used reaction vessel 40 under control of the controller 16. As shown in FIGS. 1-10, and specifically in FIGS. 8A, 8B and 10, the sample handling and preparation station 12 has suitable structure associated therewith for storing the reaction vessel, and also has suitable structure associated therewith, such as a robotic arm, for retrieving the reaction vessel 40, step 90. The sample handling and preparation station 12 then proceeds to fill the reaction vessel 40 with a suitable sample 48 to be subsequently analyzed by the analyzer station 14, step 92. The filled reaction vessel 40 is then conveyed or transported by the robotic arm to the analyzer station 14 and placed within a selected hole 54 of the tray 50, step 94. This process can be repeated a selected number of times so as to provide and mount a series of reaction vessels in the tray 50. The reaction vessel 40 is held in the hole 54 by the mating engagement of the resilient member 56 of the tray and the surface feature 46 formed on the outer surface of the reaction vessel.

The autosampler assembly 70 portion of the analyzer and sample handling system 10 then proceeds to process the sample in the reaction vessel. To that end, the tray 50 or the needle assembly portion of the analyzer unit 26 is moved over a selected one of the reaction vessels. The needle element 78 is then moved from a stowed position to a deployed position and hence is introduced into the sample 48 housed within the chamber 44 of the reaction vessel 40 The sample can be withdrawn from the reaction vessel via operation of the pump assembly 76, step 96. The sample 48 can then be introduced to the analyzer 74 of the analyzer unit 26. According to one preferred practice, the analyzer is a mass spectrometer that can be used to determine the elemental or isotopic signature of the sample, the masses of particles and of molecules thereof, and to elucidate the chemical structures of molecules, such as peptides and other chemical compounds. This information can be displayed to the system user.

The controller 16 can then control the pressing assembly to move the pressing member 80 in an axially downward direction so as to contact and apply a downward force to the reaction vessel. The downward force applied by the pressing member can be sufficient to push the rib 48 of the reaction vessel 40 through or by the resilient member 56, so that the reaction vessel falls through the hole 54, step 98. The reaction vessel can thus be disposed of without requiring the use of an additional robotic arm.

It will thus be seen that the present teachings efficiently attain the objects set forth above, among those made apparent from the preceding description. Since certain changes may be made in the above constructions without departing from the scope of the present teachings, it is intended that all matter contained in the above description or shown in the accompanying drawings be interpreted as illustrative and not in a limiting sense.

It is also to be understood that the following claims are to cover all generic and specific features of the teachings described herein, and all statements of the scope of the teachings which, as a matter of language, might be said to fall therebetween.

What is claimed is:

1. An analyzer and sample handling system, comprising a sample tray including a plurality of holes formed within a main body of the tray, wherein each respective hole of the plurality of holes has an opening having a first diameter, and a resilient member respectively associated with each of the plurality of holes and an opening formed in the resilient member, wherein the resilient member is positioned so as to extend across at least a portion of a respective hole of the plurality of holes, wherein the opening of the resilient member has a second diameter that is less than the first diameter of the respective hole of the tray, a reaction vessel having a main body forming an internal chamber and having one or more surface features extending outwardly from an outer surface of the main body of the reaction vessel, wherein the diameter of the one or more surface features is larger than the second diameter of the resilient member and smaller than the first diameter of the respective hole of the tray, a sample handling and preparation station including a transport unit for holding the reaction vessel and for transporting the reaction vessel to the tray, and a dispensing unit for introducing a sample into the chamber of the reaction vessel, and an analyzer station including an analyzer unit for analyzing the sample in the reaction vessel, wherein the analyzer unit includes an autosampler assembly having a pump assembly for withdrawing a selected amount of the sample from the reaction vessel, an analyzer in fluid communication with the pump assembly for analyzing the withdrawn sample, a needle assembly in fluid communication with the pump assembly having a needle element movable between a first position where the needle is disposed outside of the chamber of the reaction vessel and a second position where the needle element is disposed within the chamber of the reaction vessel, and a pressing assembly having a pressing member disposed about the needle element and being axially movable along an axis of the needle element, wherein the tray is configured to be disposed beneath the analyzer unit and the reaction vessel is disposed within the respective hole of the tray by the transport unit such that the one or more surface features contacts the resilient member and is supported thereby within the hole, and wherein the pressing member is axially movable so as to apply a downward force to the reaction vessel when positioned within the respective hole of the tray so as to push the one or more surface features past the resilient member such that the reaction vessel is no longer supported within the respective hole of the tray.

2. The analyzer and sample handling system of claim 1, wherein the transport unit comprises a robotic arm.

3. The analyzer and sample handling system of claim 1, wherein the analyzer comprises a mass spectrometer.

4. The analyzer and sample handling system of claim 1, wherein the resilient member is formed of rubber.

5. The analyzer and sample handling system 1, wherein the sample tray is formed of plastic.

6. The analyzer and sample handling system of claim 1, wherein each of the one or more surface features comprises a rib element.

7. An analyzer and sample handling system, comprising a tray including a plurality of holes formed within a main body of the tray, a reaction vessel having a main body forming an internal chamber for holding a sample, a sample handling and preparation station including a transport unit for holding the reaction vessel and for transporting the reaction vessel to the tray, and a dispensing unit for introducing a sample into the chamber of the reaction vessel, and an analyzer station including an analyzer unit for analyzing the sample in the reaction vessel, wherein the analyzer unit includes an autosampler assembly having a pump assembly for withdrawing a selected amount of the sample from the reaction vessel, an analyzer in fluid communication with the pump assembly for analyzing the withdrawn sample, a needle assembly in fluid communication with the pump assembly having a needle element movable between a first position where the needle is disposed outside of the chamber of the reaction vessel and a second position where the needle element is disposed within the chamber of the reaction vessel, and a pressing assembly having a pressing member disposed about the needle element and being axially movable along an axis of the needle element, wherein the tray is configured to be disposed beneath the analyzer unit and the reaction vessel is disposed within a hole of the plurality of holes of the tray by the transport unit, and wherein the pressing member is axially movable so as to apply a sufficient downward force to the reaction vessel when positioned within the hole of the plurality of holes of the tray so as to push the reaction vessel such that the reaction vessel is no longer supported within the hole of the plurality of holes of the tray.

8. The system of claim 7, wherein each of the holes of the tray has an opening having a first diameter, and wherein the tray further comprises a resilient member associated with each of the plurality of holes and having an opening formed therein, wherein the resilient member is positioned so as to extend across at least a portion of the hole, and wherein the opening of the resilient member has a second diameter that is less than the first diameter of the hole of the tray, wherein the reaction vessel includes one or more surface features extending outwardly from an outer surface of the main body, wherein the diameter of the surface feature is larger than the second diameter of the resilient member and smaller than the first diameter of the hole of the tray, such that the surface feature contacts the resilient member and is supported thereby within the hole.

9. The system of claim 8, wherein the pressing member is configured to push the surface feature past the resilient member such that the reaction vessel is no longer supported within the hole of the tray.

10. The analyzer and sample handling system of claim 7, wherein the transport unit comprises a robotic arm.

11. The analyzer and sample handling system of claim 7, wherein the analyzer comprises a mass spectrometer.

12. The analyzer and sample handling system of claim 8, wherein the resilient member is formed of rubber.

13. The analyzer and sample handling system 7, wherein the tray is formed of plastic.

14. The analyzer and sample handling system of claim 8, wherein each of the one or more surface features comprises a rib element.

* * * * *